June 22, 1943.  H. O. PARSONS  2,322,660

DEVICE FOR GAUGING LIQUIDS IN CONTAINERS UNDER PRESSURE

Filed Oct. 14, 1939  2 Sheets-Sheet 1

Harrison O. Parsons INVENTOR.

BY P. L. Young ATTORNEY.

June 22, 1943.  H. O. PARSONS  2,322,660
DEVICE FOR GAUGING LIQUIDS IN CONTAINERS UNDER PRESSURE
Filed Oct. 14, 1939  2 Sheets-Sheet 2

Harrison O. Parsons INVENTOR.

BY P. L. Young ATTORNEY.

Patented June 22, 1943

2,322,660

UNITED STATES PATENT OFFICE 2,322,660

DEVICE FOR GAUGING LIQUIDS IN CONTAINERS UNDER PRESSURE

Harrison O. Parsons, Houston, Tex.

Application October 14, 1939, Serial No. 299,461

9 Claims. (Cl. 73—298)

The present invention relates to a device for gauging and sampling fluids and is directed specifically to means for gauging the level of liquids stored in systems under abnormal pressure conditions. This application is an improvement in the device disclosed in application Serial No. 170,555, filed October 23, 1937, now U. S. Patent No. 2,215,594.

In U. S. Patent No. 2,215,594, a device for gauging and sampling liquids in closed containers was disclosed, comprising a tubular casing which fits into a housing attached to the top of a container, the casing and housing being so arranged that the casing may be partially withdrawn from the casing for the purpose of making a reading without releasing pressure from the container. Within an intermediate portion of the casing is a gauge glass, and in the wall of this portion of the casing is provided a groove through which the gauge glass may be viewed. This arrangement causes a break in the cylindrical surface of the casing and requires that the housing be provided with two packing glands spaced a distance apart slightly greater than the length of the slot, because, if such a device is provided with only one packing gland, the pressure in the container is released when the casing is withdrawn such a distance that the groove enters the packing gland.

The present invention is directed to an apparatus which overcomes the above mentioned difficulties and in which a single packing gland forms a fluid-tight seal between the casing and housing at all times.

Further objects and advantages of the present invention will appear from the accompanying drawings in which Fig. 1 is a detail side elevation of the device in accordance with the present invention with parts broken away showing the interior construction;

Figure 1:
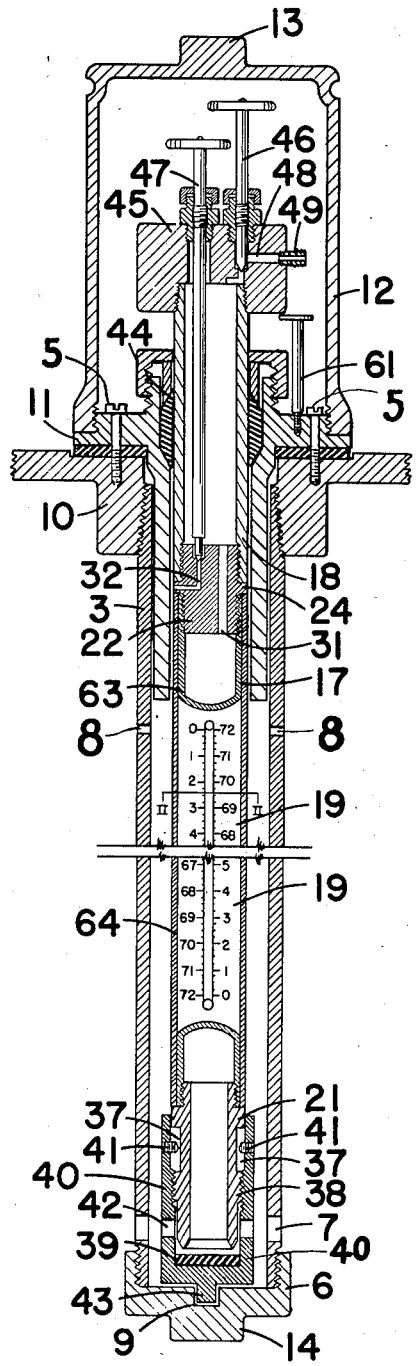

Referring to Fig. 1 in detail, numeral 3 represents the outer wall of the gauging and sampling device and is connected to a coupling member 10. Fitting upon coupling member 10 in any suitable manner so as to make a fluid-tight joint is base member 11 said coupling being secured to said base member by cap screws 5. The upper end 18 of the gauging tube is slidingly mounted in packing gland 44 of base member 11 and is provided with a head 45 which carries the valve 46, which will hereinafter be referred to with greater detail, and the valve 47 which is used to equalize the pressure inside the gauging chamber with that outside the chamber. Attached to base member 11 is sight indicator 81, and mounted thereon is a cap 12 adapted to cover the valve assembly.

The outer wall 3 carries at its lower end a base cap 6 and is provided with lateral openings 7 a short distance above said cap and lateral openings 8 a short distance below coupling member 10. Plug 6 has a groove 9 in its inner face for a purpose later to be described. The upper cap 12 and base cap 6 may be provided for the engagement of a wrench as at 13 and 14.

Contained within the housing assembly described above and carried thereby is the gauging and sampling assembly of the device indicated by numeral 17. As illustrated, the assembly comprises a tubular casing formed by a top section 18, a gauge section 19, and a bottom section 21 as well as those elements associated therewith and described in detail below. The sections may be lengthened or increased in number without interfering in any manner with the operation of the device.

The respective sections are joined by means of a coupling which provides a substantially smooth outer surface for the casing of the assembly 17 and permits sliding movement thereof through the packing gland 44 carried by base member 11. In the form illustrated, the gauge section 19 is joined to the top section 18 by means of coupling 22 having exterior threaded ends adapted for engagement with the interior of the respective sections and annular flange 24 of a width substantially equal to the wall thickness of the sections.

Gauge section 19 consists of an inner slotted brass tube 63 and an outer tube 64 constructed of a transparent plastic material. It has been found that the plastic "Lucite" is particularly suitable for such a covering because it does not discolor or change its shape when immersed in hydrocarbon materials and it has such mechanical strength that it withstands a great deal of rough handling without cracking or chipping. It has been found preferable to construct gauging and sampling assembly 17 by screwing together sections 18, 63 and 21 with coupling 22 and then molding the transparent plastic material directly onto brass tube 63 to produce the transparent tube 64. By assembling the sections in this manner, a gauge is obtained with tight joints which prevents the leakage of fluid therefrom.

The coupling 22 has a passage way 31 extending upwardly through the coupling and a valved passage way 32 extending inwardly from the outer surface of flange 24 and then upwardly in the coupling.

The bottom section has a circumferential groove 37 formed in the outer surface intermediate the ends and an exterior threaded portion 38 spaced from the lower end. The lower end of the section 21 is machined or otherwise formed in such manner as to provide for a fluid-tight seal with a disk of compressible material 39 disposed in the bottom of a closure 40 for the end of the casing.

Closure 40 comprises a cylindrical cap interiorly threaded intermediate of its length. Set screws 41 are threaded through the upper end of the cap so as to extend into the groove of the section 21. The cap has a port 42 near the bottom and a lug 43 exteriorly of its closed end which is designed to fit into the groove 9 in the base cap 6.

The top section 18 extends through the base member 11, and packing gland 44, and carries at its outer end and containable within the vapor cap 12 the gauge head 45. The head is provided with suitable openings for stemmed valves 46 and 47 which extend therethrough and with a passage way 48 opening through the head and preferably through a threaded nipple 49 thereon. The valve 46 is seated in the passage way 48 while the valve 47 extending downwardly through the top section 18 is seated in the passage way 32 of coupling 22.

Figure 2:
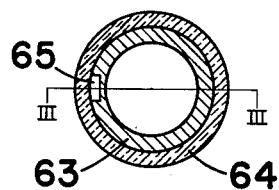
Fig. 2 is a cross sectional view taken along the line II—II of Fig. 1.

In Fig. 2 a cross sectional view of gauge section 19 taken along the line II—II of Fig. 1 is shown. This view shows the outer transparent tube 64 and the inner brass tube 63 containing groove 65.

Figure 3:
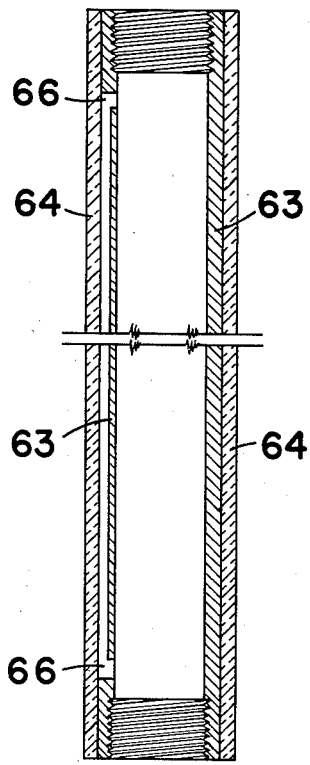
Fig. 3 is a cross sectional view taken along the line III—III of Fig. 2.

In Fig. 3 a cross sectional view of the gauge section is shown taken along the line III—III of Fig. 2. This view shows the groove extending along the brass tube 63 fluidly connected to the interior of the brass tube by orifices 66 at each end of the groove. This construction enables liquid to flow into the groove so that it may be seen through the transparent tube 64. As indicated in Fig. 1, the brass tube is provided with numerals along the side of groove 65 so that the level of the liquid in the gauge may be read off.

Figure 4:
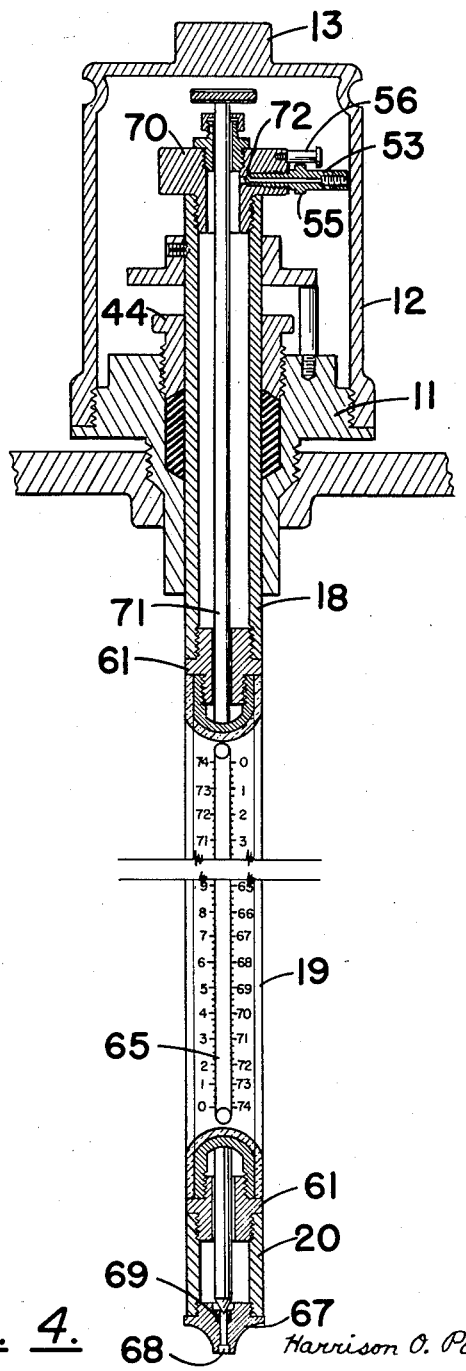
Fig. 4 is a detail side elevation of another modification of the present invention with parts broken away to show its interior construction.

In Fig. 4 a modification of the device of the present invention is shown which is particularly suitable for use in gauging liquids which do not have a high vapor pressure. In this figure like parts are designated by the same numerals as in the preceding figures.

A casing consisting of a top section 18, gauge section 19 and lower section 20 is fastened together by couplings 61. The bottom of the casing is closed by a plug 67 provided with an orifice 68 and a seat 69, and the top of the casing is closed by a plug 70. Extending from plug 70 down through the casing so that it may engage seat 69 is a valve 71 which may be operated to either open or close orifice 68.

Plug 70 is fitted with a passage 72. In passage 72 is seated a nipple 53 which has a conical projection at its forward end which is adapted to seat at the end of passage 72. The fluid passage through the nipple 53 begins at the base of the conical projection and passes through the center of the plug. The outer end of the nipple is provided with a shoulder 55 which is adapted to abut against a ledge 56, in this case the head of a screw, in order to limit outward motion of the plug. The nipple 53 is of such dimensions that when it is in closed position, its outer end is flush with the inside surface of cap 12; that is to say, cap 12 cannot be screwed into place unless the valve 53 is in closed position.

It should be evident from the foregoing description that this invention is particularly useful for gauging liquid levels in containers in which access to a liquid is hazardous or difficult when either very volatile liquids or liquids under pressure are involved or when the devices ordinarily used are in any way unsuitable.

The device shown by Figs. 1, 2 and 3 may be used to carry out the gauging operation in either of two ways. The first is suitable for use under any pressure conditions existing in the tank, while the second is suitable when the liquid is held under pressure somewhat greater than atmospheric.

By the first method, the gauging device is rotated in the housing while it is fully sheathed in order to uncover the normally closed port 42 in the cap 40. Lug 43 engages the groove 9 so as to maintain cap 40 stationary, while the casing 17 is unthreaded until the set screws 41 stop further movement. The next step is to open valve 47 so that pressure may be equalized between casing 17 and that in the container, by allowing fluid to flow through the annular space between base member 11 and casing 17 and then through passage 32. After a brief interval for equalization, the valve 47 is closed and the port 42 is covered by rotating the casing 17 in a direction opposite to that used in the first step. The casing is then withdrawn from the housing and the liquid level in the tube 63 may then be directly viewed through the transparent covering 64 and the liquid level in the gauge read directly from the calibration on the brass tube 63.

According to the second method, the port 42 is opened in the manner described above and the casing withdrawn for such a length that its bottom clears the liquid level in the container. The valve 46 is then opened slightly and the casing lowered gradually until liquid discharges from nipple 49. When this occurs, it is known that port 42 has been lowered to the liquid level. By noting the position on the calibration of the gauge 19 with relation to indicator 81 the liquid level may be determined with a fair degree of accuracy, although there will be a very small loss of pressure and liquid through the passage way 48. This method is only satisfactory when exceedingly accurate readings without loss of any sort are not required or when only an approximate maximum upper level is required.

This device may also be used to obtain samples by placing a receptacle under the nipple 49 and opening the valve 46, thus permitting liquid to flow from the casing into the receptacle. Obviously, the sampling must be done either when the container is under super-atmospheric pressure, or by applying suction to the nipple 49 when the container is under atmospheric or sub-atmospheric pressure.

The device shown in Fig. 4 has no means for equalizing the pressure in the gauging device with that in the container. This device is accordingly suitable for use in liquids which have a low vapor pressure so that the container will be at atmospheric pressure; when used this way, the liquid level is read directly from the scale. However, this device may be also used for gauging liquid under super-atmospheric pressure by using it according to the second method described above in connection with the device shown in Figs. 1, 2 and 3.

Since the device shown in Fig. 4 is equipped with two valves, valves 71 and 53, in order to obtain gauges, both of these valves must be opened in order to allow the liquid to rise in the valve 53. As a safety measure the gauge is so constructed that it must be closed in order to place the cap 12 on the gauge because if the valve is not closed it projects out and prevents cap 12 from being placed in position.

While the device shown in Figs. 1, 2 and 3 is fitted with the same valve arrangement described in the U. S. Patent No. 2,215,594, it is evident that the improved valve arrangement described in U. S. Patent No. 2,228,481 may be substituted therefor.

Various changes and alternative arrangements may be made within the scope of the appended claims in which it is intended to claim all novelty inherent in the invention as broadly as the prior art permits.

I claim:

1. In a gauge comprising a tubular structure, a valve closure for the lower end of the structure, a valve head closing the upper end of the structure, the valve head having an outlet and a valve controlling the outlet, in combination, a tubular transparent member arranged to form an intermediate portion of said structure, said transparent member having a tubular opaque member fitting inside thereof, the outer circumference of said opaque member being provided with a longitudinal groove having fluid communication with the interior of the member at both ends of the groove, said transparent member and said opaque member being bonded together in a fluid-tight manner except along said groove, whereby a longitudinal passage is defined by the walls of said groove and said transparent member.

2. A gauge in accordance with claim 1 in which the exterior of said tubular opaque member is provided with a scale extending longitudinally along said member adjacent said groove and visible through the transparent member.

3. A gauge comprising a tubular casing, a valve closure for the lower end of said casing, a valve head closing the upper end of the casing, said valve head having an outlet and a valve controlling the outlet, a portion of said casing being formed of an interior opaque tube and a concentric transparent exterior tube, the exterior of said opaque tube being provided with a longitudinal groove having a fluid communication with the interior of the tube at each of its ends, said transparent tube being bonded to said opaque tube in a fluid tight manner except along said groove.

4. An apparatus for gauging and sampling liquids in a closed container comprising a housing extending into the container and in free communication therewith, a gauge casing extending into the housing from its upper end, said casing having a smooth exterior surface of uniform circumference throughout its length, a transparent member forming an intermediate section of said casing arranged so that its exterior forms a portion of the exterior of said casing, a valved closure for the upper end of said casing and a valved closure for the lower end thereof, means for operating the valve closure for the lower end, means for equalizing pressure within the casing with that existing in the housing and in the container, means for withdrawing liquid through the casing, and a single packing gland arranged in the upper part of said housing for maintaining a fluid-tight seal between the casing and housing while permitting partial withdrawal of the former from the latter.

5. A gauge of the character described comprising a tubular transparent member, a tubular opaque member fitting inside the transparent member and provided on its exterior with a longitudinal groove having fluid communication at both its ends with the interior of the opaque member, said transparent member being bonded to said opaque member in a fluid-tight manner except along said groove, extensions having the same exterior dimensions as the transparent member extending above and below said transparent member, the upper extension being fitted with a valve head having an outlet and a valve controlling said outlet, and the lower extension being fitted with a valve closure.

6. A gauge comprising a tubular casing, a valve closure for the lower end of the casing, a valve head closing the upper end of the casing, an intermediate portion of said casing being constructed of a grooved metal inner tubular member provided with transverse passages fluidly connecting the ends of the groove with the interior of said tubular member and an outer transparent resin tubular member bonded to said inner tubular member in a fluid tight manner except along said groove.

7. A gauge suitable for longitudinal movement in a packed opening without the release of pressure between the gauge and the opening comprising, in combination, an elongated metal body having a longitudinal passage extending therethrough, said body carrying a valve head at its upper end arranged for controlling the upper end of said passage, and a valve closure at its lower end arranged to control the lower end of said passage and to be opened and closed by manipulation of a member at the upper end of the gauge, a non-metallic transparent member arranged exteriorly over a portion of said metal body to provide a second longitudinal passage between said member and said body, transverse passages arranged to connect the ends of the second longitudinal passage with the longitudinal passage extending through the metal body, the metal body and the transparent member being arranged to provide the gauge with an exterior having uniform dimensions from said valve head to said valve closure.

8. A device in accordance with claim 7 in which said metal body is provided with a longitudinally extending scale arranged adjacent said second mentioned longitudinal passage.

9. A gauge comprising a tubular structure of uniform perimeter, a valve closure for the lower end of the structure arranged to be opened and closed by rotation of a member at the upper end of the gauge, a valve head closing the upper end of the structure, said valve head having an outlet and a valve controlling the outlet, a portion of said tubular structure being comprised by an opaque member of substantially tubular shape having bonded to the exterior thereof a transparent member, said members being arranged to provide a longitudinal conduit having its walls defined by said two members, and transverse passages extending through the walls of said opaque tubular member arranged to connect the ends of said conduit with the interior of said opaque member.

HARRISON O. PARSONS.